United States Patent [19]
Squiers

[11] 3,794,858
[45] Feb. 26, 1974

[54] OFF DELAY TIMER AND PTC SENSING CIRCUIT

[75] Inventor: David J. Squiers, Attleboro Falls, Mass.

[73] Assignee: Texas Instruments Incorporated, Dallas, Tex.

[22] Filed: Dec. 13, 1972

[21] Appl. No.: 314,874

[52] U.S. Cl........ 307/293 R, 317/13 A, 317/33 SC, 317/36 TD, 317/141 S
[51] Int. Cl. .......................................... H03k 17/28
[58] Field of Search.. 317/36 TD, 41, 33 SC, 141 S, 317/132, 136, 13 A; 307/293

[56] References Cited
UNITED STATES PATENTS

| | | | |
|---|---|---|---|
| 3,742,303 | 6/1973 | Dageford | 317/36 TD X |
| 3,742,302 | 6/1973 | Neill | 317/36 TD X |
| 3,457,460 | 7/1969 | Buiting et al. | 317/41 |
| 3,619,668 | 11/1971 | Pinckaers | 317/36 TD |
| 3,660,718 | 5/1972 | Pinckaers | 317/36 TD |

Primary Examiner—A. D. Pellinen
Assistant Examiner—Harry E. Moose, Jr.
Attorney, Agent, or Firm—John A. Haug; Edward J. Connors, Jr.; James P. McAndrews

[57] ABSTRACT

The disclosure relates to a timing circuit for use in conjunction with a protection circuit wherein, under normal operation, the timing circuit is isolated from the protection circuit. Upon sensing of an alarm condition by the protection circuit, the timing circuit is activated and prevents the protection circuit from again becoming operable and allowing power to be supplied to the protective device for a predetermined time period as set by the parameters of the timing circuit. This prevents the reapplication of power to the protected device as soon as the alarm condition has been removed.

5 Claims, 1 Drawing Figure

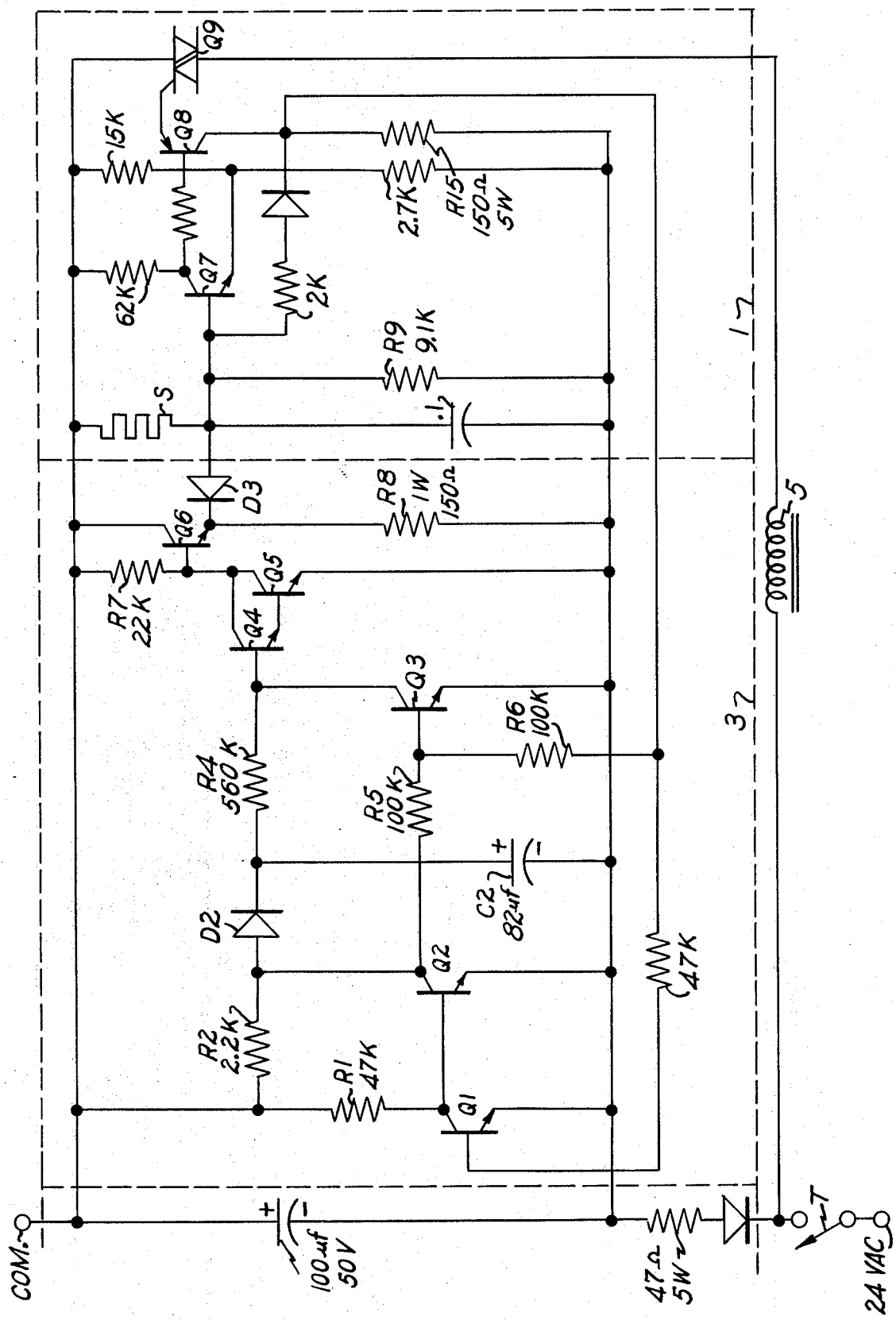

OFF DELAY TIMER AND PTC SENSING CIRCUIT

This invention relates to an off delay timer and, more specifically, to a timing circuit which is made operational by a predetermined condition or conditions and then provides a time delay for reapplication of power to a protected circuit.

Protection circuits are well known in the prior art for interrupting the supply of power to a load, such as a motor, in the event that an alarm situation is sensed. Systems of this type can be manually or automatically resettable. The automatically resettable protection circuits of the prior art have the capability of renewing the supply of power to the protective load upon removal of the alarm causing condition. However, there are many situations where it is undesirable to supply power to the protected load immediately upon removal of the alarm condition. In many cases, it is necessary to provide a time delay of predetermined magnitude after shut down before start up to alleviate undesirable conditions. One such example would be in the prevention of icing situations in air conditioners. In such a situation, upon shut down of the air-conditioning unit due to alarm or the like, it is desirable that shut down be continued for a predetermined period.

In accordance with the present invention, there is provided an off delay timer, also commonly known as an anti-diddle timer, which is normally isolated from the protection circuit during normal operation. However, upon the sensing of an alarm condition, such as one caused by over-temperature sensed by sensors, the opening of any switch in series with a sensor, the opening of a thermostat or switch, the opening of any switch in series with the input, the interruption of power or the rapid opening and closing of the thermostat will bring the timing circuit into operation, the timing circuit thereby preventing reapplication of power to the protected device for the time period as determined by the timing circuit parameters.

It is therefore an object of this invention to provide a timing circuit which is normally isolated from a protection circuit for preventing application of power for a predetermined time period after sensing of a predetermined condition.

It is a further object of this invention to provide a timing circuit which prevents reapplication of power to a load for a predetermined time after an initial loss of said power.

The above objects and still further objects of the invention will immediately become apparent to those skilled in the art after consideration of the following preferred embodiment thereof, which is provided by way of example and not by way of limitation, wherein:

The FIGURE is a circuit diagram of a protection circuit used in conjunction with the timing circuit of the present invention.

Referring now to the FIGURE, there is shown a protection circuit 1 to which is coupled to the timing circuit 3 in accordance with the present invention. Although various protection circuits may be used with the timing circuit of the present invention, the one disclosed in the FIGURE is identical to the protection circuit in co-pending application Ser. No. 314,883, filed of even date herewith. During normal operation of the protection circuit 1, the transistors Q7 and Q8 are conducting and the triac Q9 provides power to the contactor 5 for application of power to the protected device. Upon sensing of an alarm condition by the sensors, transistors Q7 and Q8 become non-conducting and turn off triac Q9 to prevent the application of power to the protected device. A more detailed discussion of the operation of this circuit is provided in the above-mentioned co-pending application. At start up during normal operating conditions, the voltage at the junction of a PTC sensor S and resistor R9 is low with respect to common since the sensor resistance is low at this time. Transistor Q6 is on since transistors Q4 and Q5 are off at this time. Since transistor Q6 is conducting, there is a high voltage across resistor R8 and the diode D3 is therefore reverse biased. This causes the timing circuitry 3 to be isolated from the protection circuit 1. When an alarm condition is sensed, the sensor resistance increases and turns off the transistors Q7 and Q8. This causes the voltage across resistor R15 to go down and, thereby, the signal to the base of transistor Q1 therefrom turns transistor Q1 off and thereby turns transistor Q2 on. This clamps the charge that is then on capacitor C2 and turns off the transistor Q3. Capacitor C2 then discharges through resistor R4 in the base circuit of the Darlington Pair composed of transistors Q4 and Q5. This causes resistor R7 to be clamped to a low voltage and the voltage across resistor R8 goes to a low value. Diode D3 therefore conducts since resistor R8 and diode D3 are in parallel with resistor R9, the diode D3 and resistor R8 branch being of much lower resistance than resistor R9. Thereby, the current is shunted in the low resistant path and the protection circuit is cut-off. This condition will remain until capacitor C2 discharges sufficiently to allow the Darlington Pair composed of transistors Q4 and Q5 to turn off, thereby allowing transistor Q6 to turn on and again back bias the diode D3. At this point the protection circuit is isolated from the timing circuit and prepared for normal operation. It can be seen that the time delay is determined by the value of capacitor C2 and resistor R4 essentially.

When the protection circuit is reenergized, the motor or other protected device that it is protecting is turned on. The voltage across resistor R15 now goes to a higher voltage, thereby turning transistor Q1 back on. This causes transistor Q2 to turn off and capacitor C2 now recharges through resistor R2 and diode D2 and arms the timer 3 for another timing function when another alarm condition or fault occurs as previously described.

The thermostat circuit T is an input switch to the total system. If the thermostat is opened and then closed there will again be an off time determined by the time constant of the timing circuit and during the off time operation of the equipment protected by the protection circuit 1 is prevented. This prevents destruction to equipment caused by tampering with the thermostat and the like. Opening of the thermostat switch removes the high voltage from the protection circuit as well as from the timing circuit, therefore providing for operation of the timing circuit with the discharge of capacitor C2 in the manner explained above. Once capacitor C2 starts to discharge into transistor pair Q4, Q5, it must complete its discharge to the predetermined low level and therefore the circuit is a lock-out or an off delay timing circuit.

Referring now to the PTC sensor elements, these are well known materials, preferably steep slope PTC or positive temperature coefficient type devices. These materials have a relatively constant resistance for increase in temperature until a particular threshold temperature is reached whereupon, at the anomaly temperature, the temperature coefficient of the material increases dramatically. The PTC sensors are usually formed from doped barium titanate, the anomalous behavoir being caused by a change in the crystal structure of the doped barium titanate ceramic. The characteristic anomaly temperature and resultant temperature coefficient are determined by the chemical composition of the barium titanate. resistance changes of the PTC devices in the steep slope region after the anomaly temperature has been reached fall in the range of 25 to 150 percent per degree Centigrade.

Although the invention has been described with respect to a specific preferred embodiment thereof, many variations and modifications will become apparant to those skilled in the art. It is therefore the intention that the appended claims be interpreted as broadly as possible in view of the prior art to include all such variations and modifications.

What is claimed is:

1. An off delay timing circuit for use in conjunction with a control circuit, which comprises:
   a. control means for controlling the application of power to an external device, said control means having two operating states, said control means normally operating in one of said two operating states,
   b. said control means including means responsive to a predetermined condition to cause said control means to operate in the other of its two operating states including a voltage divider, said voltage divier comprising a condition responsive element serially connected to a first resistive element, whereby the operating state of said control means is determined by the voltage at the junction of said condition responsive element and said first resistive element, and
   c. delay means, normally electrically isolated from said control means, responsive to said means responsive to a predetermined condition sensing said predetermined condition, for inhibiting said means responsive to a predetermined condition from causing said control means to operate in said one of said two operating states for a predetermined time, said delay means including a diode, said diode being reverse biased when sai control means is operating in said one operating state and forward biased when said control means is operating in the other of its two operating states, and a second resistive element coupled to said diode, said first resistive element being connected in parallel with the combination of said diode and second resistive element.

2. An off delay timing circuit as set forth in claim 1 wherein said means responsive to a predetermined condition includes a PTC device.

3. An off delay timing circuit as set forth in claim 1 wherein said delay means includes a normally charged capacitor, means responsive to sensing of said predetermined condition to cause said capacitor to discharge at a predetermined rate and means responsive to a predetermined state of discharge of said capacitor for permitting said diode to be reverse biased.

4. An off delay timing circuit as set forth in claim 1 further including a source of electrical power coupled across both said control means and said delay means, said delay means also being responsive to the removal of said power for inhibiting said means responsive to a predetermined condition from causing said control means to operate in said one of said two operating states for said predetermined time.

5. An off delay timing circuit as set forth in claim 5 further including a source of electrical power coupled across both said control means and said delay means, said delay means also being responsive to the removal of said power for inhibiting said means responsive to a predetermined condition from causing said control means to operate in said one of said two operating states for said predetermined time.

* * * * *